United States Patent [19]

Blackwell

[11] 4,030,882

[45] June 21, 1977

[54] SOLVENT DYEING COMPOSITIONS AND A METHOD OF DYEING POLYESTER FIBERS THEREWITH

[75] Inventor: Samuel E. Blackwell, Kingsport, Tenn.

[73] Assignee: Eastman Kodak Company, Rochester, N.Y.

[22] Filed: Jan. 2, 1975

[21] Appl. No.: 538,071

[52] U.S. Cl. .................................. 8/39 R; 8/41 R; 8/82; 8/85 R; 8/89 R; 8/94 A; 8/169; 8/171; 8/172 R; 8/173; 8/174
[51] Int. Cl.² ...................... C09B 1/00; C09B 5/62
[58] Field of Search ............ 8/82, 174, 39 R, 41 R, 8/85 R, 89 R, 94 A

[56] References Cited

UNITED STATES PATENTS

| 3,510,891 | 5/1970 | Luongo | 8/173 |
| 3,728,078 | 4/1973 | Freshwater et al. | 8/174 |
| 3,771,956 | 11/1973 | Abeta | 8/174 |
| 3,775,049 | 11/1973 | Wolfrum | 8/41 C |
| 3,785,767 | 1/1974 | Hildebrand et al. | 8/54 |

OTHER PUBLICATIONS

Griffin, J. Soc. Cosmetic Chemists, 1949, 1, pp. 311-326.
McCutcheon's Detergents and Emulsifiers, 1973 North American Edition, pp. 199-205.
Peters, "Textile Chemistry", (Elsevier, 1975), pp. 67-85.
Rattee and Breuer, "The Physical Chemistry of Dye Adsorption," (Academic Press, 1974), pp. 221-243.
Peters, "Textile Chemistry", vol. III, (Elsevier, 1975), pp. 67-85.

Primary Examiner—Joseph L. Schofer
Assistant Examiner—A. L. Clingman
Attorney, Agent, or Firm—Donald W. Spurrell; Daniel B. Reece, III

[57] ABSTRACT

Dye compositions comprising one or more disperse dyes and one or more surfactants having a hydrophilic-lypophilic balance rating of about four to eight, and dyebaths comprising preferably at least a major proportion of a halogenated hydrocarbon with or without a minor proportion of water and the described dye composition, are highly effective in dyeing synthetic fibers such as nylon, acetate, and particularly polyester.

5 Claims, No Drawings

SOLVENT DYEING COMPOSITIONS AND A METHOD OF DYEING POLYESTER FIBERS THEREWITH

This invention relates to novel dye compositions and, more particularly, to the combination of one or more disperse dyes and certain surface-active agents, and to dyebaths thereof in certain solvents, useful in dyeing polyester fibers in particular, but also nylon and acetate fibers.

Because of concern for water pollution resulting from the aqueous dyeing of fibers and fiber-containing articles, considerable research has been conducted on the use of organic solvents rather than water as the dyeing medium. Dyeing, however, from organic solvents has found little acceptance in the dyeing industry, principally because of one of the primary reasons the unavailability of commercial dye preparations which are suitable for use in solvent based systems. Commercial dye preparations presently available comprise dye cake, that is, a dye compound which generally contains minor amounts of impurities, a water-soluble diluent for standardization purposes such as sodium sulfate and one or more water-soluble surfactants. Due to reactant impurity or the nature of the multi-step reactions used in the synthesis of dye compounds, the color yield or shade from different batches of a dye cake will vary. The dye preparation therefore must be "standardized" by varying the amounts of dye cake and diluent used in the dye preparation so that the color yield or strength of the preparation is the equivalent of a sample used as the standard.

Presently-available dye preparations are not suitable for use in organic solvent dyeing systems because the water-soluble diluents and surfactants are deposited on the fibers being dyed and produce commercially unacceptable stained or dirty dyeings. Although the diluents and surfactants can be removed from the fiber by an aqueous after-scour, such subsequent treatment results in the loss of the important advantages of dry-to-dry cycle time offered by an organic solvent dyeing system.

The disadvantages inherent in the use of disperse dye formulations in organic solvent dyeing systems are overcome by the present invention which comprises the mixture of one or more disperse dyes and one or more surfactants having a hydrophilic-lypophilic balance (HLB) rating between about four and eight. The invention also encompasses the use of such as combination in dyebaths comprising select organic solvent, with or without a minor amount of water, and the dyeing of fibers from such a dyebath. The amount of water tolerable depends on the ingredients employed, the dyeing temperature and concentrations of all components, and will vary considerably. In this regard, certain dyes will give a better color yield if some water, up to about 20% by volume, is present.

The disperse dye compounds useful in practicing my invention are described extensively in the patent literature and in the Colour Index, and include azo, anthraquinone, diarylamine, methine, azo methine, disazo, styryl azo, quinophthalone, acridone, and naphthazarin derivatives. These compounds are characterized by the absence of ionic groups such as sulfonate, which would render the compounds totally water-soluble in concentrations ordinarily used in aqueous dyeing systems. Preferred ones of these dyes are listed in Table I.

TABLE I

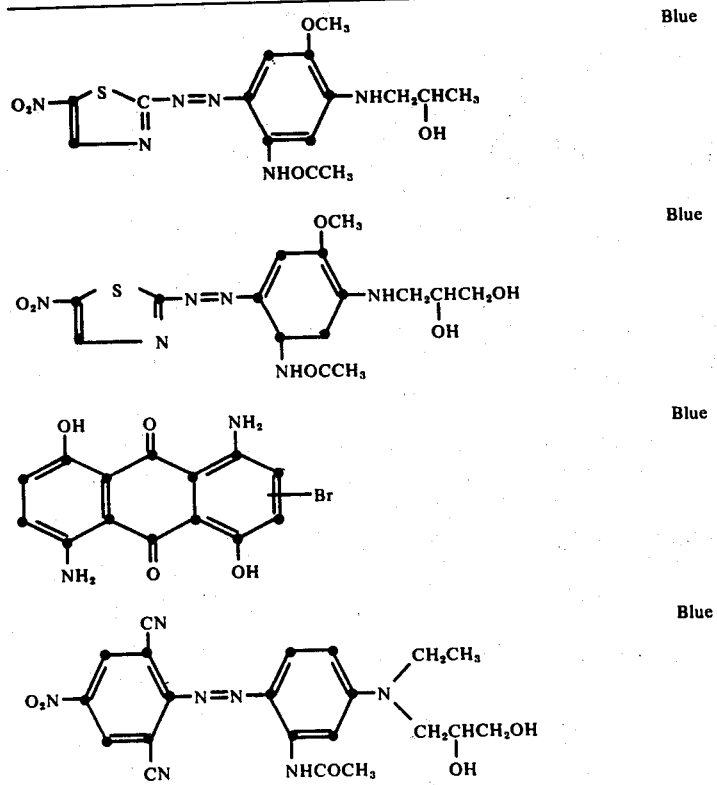

TABLE I-continued
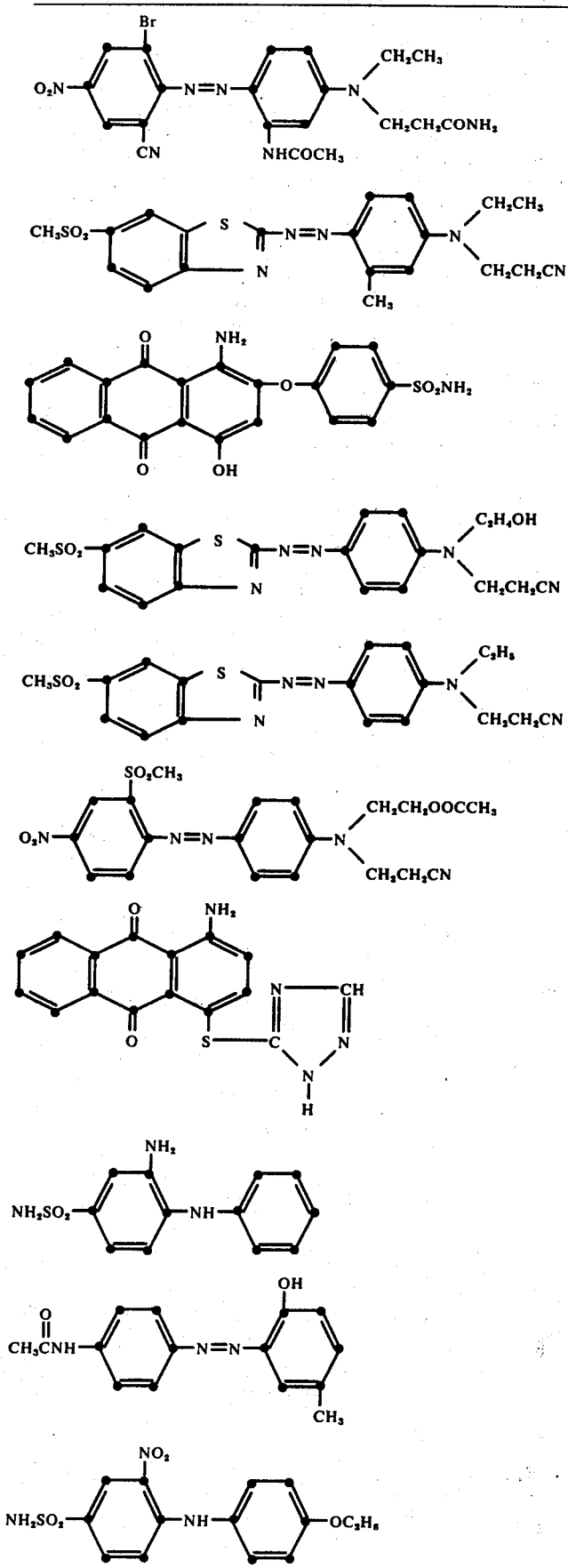

TABLE I-continued

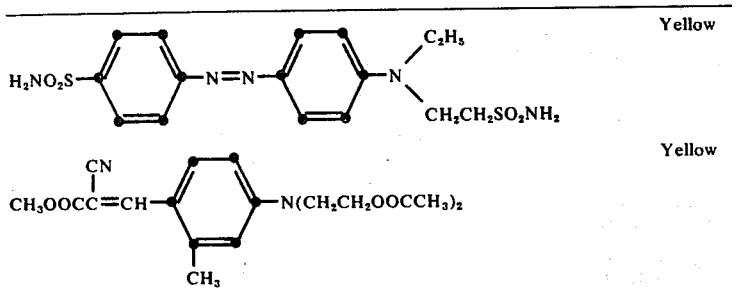

Yellow

Yellow

The invention in its general sense may be defined as a composition useful in nonaqueous, hydrophobic solvent dyeing comprising from 5–75 parts by weight of a nonionic, disperse dye and conversely from 95–25 parts by weight of a surfactant having a HLB rating of four to eight.

In a more specific sense the invention comprises the composition of Claim 1 wherein the dye is selected from azo, anthraquinone, diarylamine, methine, azo methine, disazo, styryl azo, quinaphthalone, acridone, and naphthazarin derivatives, and the surfactant is selected from ethoxylated alcohols, ethoxylated alcohol sulfates, alcohol sulfates, alkane sulfonates, alkanolamides, alkyl sulfonates, alkyl aryl sulfonates wherein the alkyl is 4–20 carbons, ethyloxylated alkyl phenols and their sulfonates wherein the alkyl is 4–20 carbons and the ethylene oxide is 2–10 units, ethoxylated amines, amides, and their sulfonates, aryl sulfonates, betamine derivatives, diphenyl sulfonate derivatives, ethoxylated fatty acids, fatty acid soaps, sulfonated fatty esters of fluorinated compounds, glyceryl esters, imidazoline derivatives, lecithin derivatives, monoglycerides, phosphate esters and ethoxylates, sulfosuccinate derivatives, tertiary amine oxides, and amide sulfates.

As mentioned above, the surfactant component of my novel composition must have an HLB rating of about four to eight. This HLB rating requirement will enable those skilled in the art to readily determine whether a surfactant is suitable. As is described in the appendix of *McCutcheon's Detergents and Emulsifiers*, 1971 Annual, the HLB rating is determined according to the following procedure:

A specific test oil and water are to be emulsified. Oleic acid and potassium oleate are the primary reference emulsifiers. The oleic acid is assigned the arbitrary HLB number of 1 as the lypophilic component and potassium oleate is assigned the arbitrary HLB number of 20 as the hydrohilic component. All subsequent HLB numbers are derived from these primary standards even if determined from secondary reference emulsifiers. It is then assumed that the two primary reference emulsifiers, and all subsequent emulsifiers, can be blended in various ratios on a weight fraction basis in a linear and additive manner to give a continuous series of HLB numbers according to the following equation:

$$\frac{W_A \times HLB_A + HLB_B}{W_A + W_B} = HLB_{AB}$$

where
$W_A$ = weight of emulsifier A (oleic acid)
$W_B$ = weight of emulsifier B (potassium oleate)
$HLB_A$ = HLB number of emulsifier A (oleic acid = 1)
$HLB_B$ = HLB number of emulsifier B (potassium oleate = 20)
$HLB_{AB}$ = calculated HLB number for any given weight ratio of A to B The HLB number of the ratio of reference emulsifiers which gives the most stable emulsion with a given oil, as determined by experiments, may be designated the HLB requirement for that oil when used with any combination of emulsifiers.

Two primary reference emulsifiers of assigned HLB numbers and one oil for which the HLB requirement has been expiermentally determined are now available. Using this oil and one of the reference emulsifiers in combination with an unknown emulsifier, the complete experimental procedure is repeated and the HLB number of the unknown emulsifier calculated. The relationship between HLB range and emulsion structure is summarized in Table II.

TABLE II

| HLB Range | Description of Emulsion |
| --- | --- |
| 16–20 | No emulsions, emulsifier solubilized in water phase |
| 12–15 | oil-in-water emulsion o/w |
| 8–10 | planar, lamellar gel, inversion point |
| 4–6 | water-in-oil emulsion w/o |
| 1–4 | no emulsion, emulsifier solubilized in oil phase |

Examples of surfactants having a HLB rating of about four to eight include sorbitan fatty acid esters such as sorbitan monostearate, fatty acid esters of sodium sulfosuccinate such as bis(tridecyl)sodium sulfosuccinate, salts of alkyl benzene sulfonic acid such as isopropylamine dodecylbenzene sulfonate, long chain linear alkyl benzene sodium sulfonates, condensation products of fatty esters with ethylene and/or propylene oxides, ethylene oxide condensation products of fatty amines, mono- and diglycerides from animal and vagetable fats, ethoxylated phenols, alkali metal salts of fatty acids, ethoxylated alcohols, ethoxylated alcohol sulfates, alcohol sulfates, alkane sulfonates, alkanolamides, alkyl sulfonates, alkyl aryl sulfonates wherein the alkyl is 4–20 carbons, ethyloxylated alkyl phenols and their sulfonates wherein the alkyl is 4–20 carbons and the ethylene oxide is 2–10 units, ethoxylated amines, amides and their sulfonates, aryl sulfonates, betaine derivatives, diphenyl sulfonate derivatives, ethoxylated fatty acids, fatty acid soaps, sulfonates fatty esters of fluorinated compounds, glyceryl esters, imidazoline derivatives, lecithin derivatives, monoglycerides, phosphate esters and ethoxylates, sulfosuccinate derivates, tertiary amine oxides, and amide sulfates.

Preferred ones of these surfactants are sorbitan fatty acid esters such as sorbitan monostearate, fatty acid esters of sodium sulfosuccinate such as dioctyl or bis(- tridecyl)sodium sulfosuccinate, and salts of alkyl benzene sulfonic acid such as isopropyl amine dodecylbenzene sulfonate.

The method by which the two components of my novel composition are combined is not important although the physical characteristics of the surfactant can dictate the most convenient technique. The dye compound can be mixed with the surfactant which may be solid or liquid, followed by pulverization or flaking. Alternatively, the dye cake and surfactant can be combined by dissolving them in an organic solvent. The resulting liquid can be used as such in solvent dyeing if the organic solvent is compatible with those specified herein to be employed in solvent dyeing systems, or the solvent can be vaporized leaving an intimate dye cake-surfactant mixture which can be ground or flaked. If the surfactant is liquid at ambient temperatures, the dye cake usually can be dissolved in it to form a liquid composition.

The weight ratio of the two components of my composition will vary depending upon a number of factors such as the desired physical form, solid, liquid or wax, of the composition, and of course the physical characteristics of the surfactant and dye cake. The amount of surfactant used should permit color standardization of the combination and, if necessary, processing, such as grinding or flaking, of the combination. In most cases, weight ratios of dye cake to surfactant in the range of about 1/1 to 1/10 give good results, although greater amounts of solvent may be employed.

The novel dye compositions of this invention are particularly useful in the dyeing of polyester fibers such as poly(ethylene terephthalate) from a bath whose liquid contents, other than any liquid dye composition which is used, consists essentially of about 80 to 100.0 percent by weight of a solvent, particularly a halogenated hydrocarbon, and up to about 20 percent water, based on the total volume of the hydrocarbon and water. Perchlorethylene, trichlorethylene, 1,1,1-trichloroethane, $C_6$–$C_{20}$ hydrocarbons, e.g., hexane, and Freon TF are typical solvents which can be employed. Perchlorethylene, trichlorethylene, and 1,1,1-trichloroethane are preferred, with perchlorethylene being most preferred.

The ratio of weight of dye composition to weight of halogenated hydrocarbon and water will vary depending on the shade which is to be produced on the fibers which are dyed in the bath. Optimum ratios for a particular set and concentration of components can be readily determined by one skilled in the art.

The dyeing of polyester fibers according to the invention comprises contacting the fibers with the above-described dyebath heated to a temperature of about 70° to about 150° C. for a suitable period of a few minutes to an hour or more. Such dyeing can be done in the known process such as package, jet, atmospheric, superatmospheric, Beck and the like with relatively minor modification to accommodate the organic solvent.

The invention is illustrated in the following dyeings of poly(ethylene terephthalate) fiber.

EXAMPLE 1

Sorbitan monostearate, HLB 4.7 (100 g.) is mixed with C.I. Disperse Red 137 cake (100 g.), 4-(6-methyl-sulfonyl-2-benzothiazolylazo)N,2-(hydroxyethyl-N-2-cyanoethylaniline). The mixture is combined with dry ice and passed through a chilled laboratry pulverizing mill. The resulting dye composition is a dry powder which is stable to temperature changes during storage and does not solidify or grow crystals. Dyeings on polyester fiber (2% by weight of dye based on weight of fabric sample) are made with the dye composition dispersed in 3% water by volume in perchloroethylene (10/1 of perchlorethylene in ml to fabric sample in grams). The dyeing was done by entering the fabric sample, raising the temperature to 120° C. as rapidly as possible and holding at 120° C. for 15–30 minutes. This results in red shades with full color yield that are fast to light, washing and rubbing. No aqueous rinsing is required to clear insoluble particles from the fiber surface.

EXAMPLE 2

To a melt of 50 g. of bis(tridecyl) sodium sulfosuccinate is added 6.81 g. of C.I. Disperse Red 137 cake. The dye cake readily dissolves in the molten surfactant and upon cooling a waxy solid is formed which is stable to temperature changes occurring during storage and does not harden, soften or grow crystals. Dyeings made as described in Example 1 exhibit subsantially the same properties.

EXAMPLE 3

Isopropylamine dodecylbenzene sulfonate (100 g.) is heated on a steam bath and 16 g. of C.I. Disperse Red 137 cake is added. After stirring to effect dissolution of the dye cake, the mixture is allowed to cool to room temperature. The resulting dye composition is a highly viscous liquid and is stable under storage conditions. Dyeings are made as in Example 1 with equivalent results.

EXAMPLE 4

Sorbitan monostearate (100 g) is mixed with C.I. Disperse Yellow 33 cake (100 g), 2-nitro-4-sulfonamidodiphenylamine. The mixture is raised to the melting point of the surfactant and spray chilled by forcing the melt through an orifice into a cyclone of rapidly moving air. The resulting composition is a finely divided dry powder which is stable to temperature changes during storage and does not solidify or grow crystals. Dyeings are made as in Example 1 with equivalent results.

The invention has been described in detail with particular reference to preferred embodiments thereof, but it will be understood that variations and modifications can be effected within the spirit and scope of the invention.

We claim:

1. A composition useful in nonaqueous, hydrophobic solvent dyeing comprising from 5–75 parts by weight of at least one nonionic, disperse dye and conversely from 95–25 parts by weight of one or more surfactants having a HLB rating of four to eight.

2. The composition of claim 1 wherein the dye is selected from azo, anthraquinone, diarylamine, methine, azo methine, disazo, styryl azo, quinaphthalone, acridone, and naphthazarin derivatives, and the surfactant is selected from ethoxylated alcohols, ethoxylated alcohol sulfates, alcohol sulfates, alkane sulfonates, alkanolamides, alkyl sulfonates, alkyl aryl sulfonates wherein the alkyl is 4–20 carbons, ethyloxylated alkyl phenols and their sulfonates wherein the alkyl is 4–20 carbons and the ethylene oxide is 2–10 units, ethoxylated amines, amides, and their sulfonates, aryl sulfonates, betamine derivatives, diphenyl sulfonate derivatives, ethoxylated fatty acids, fatty acid soaps, sulfonated fatty esters of fluorinated compounds, glyceryl esters, imidazoline derivatives, lecithin derivatives, monoglycerides, phosphate esters and ethoxylates, sulfosuccinate derivatives, tertiary amine oxides, and amide sulfates.

3. The composition of claim 1 wherein the dye is selected from

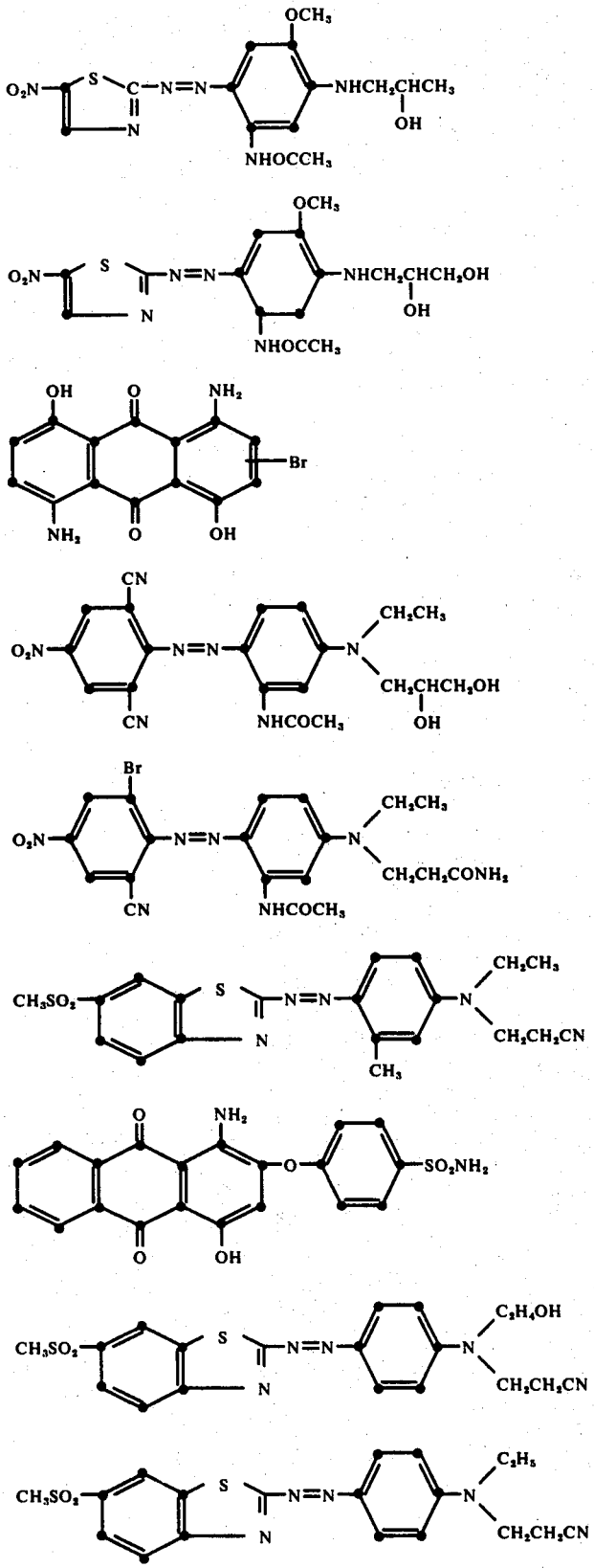

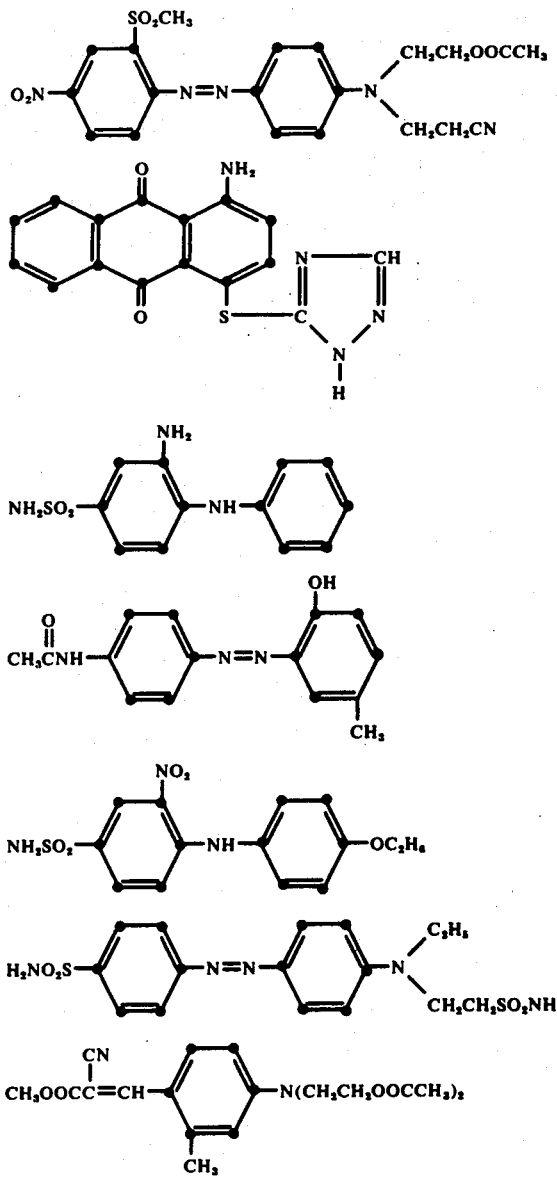

and the surfactant is selected from sorbitan fatty acid esters such as sorbitan monostearate, fatty acid esters of sodium sulfosuccinate such as dioctyl or bis(-tridecyl)sodium sulfosuccinate, salts of alkyl benzene sulfonic acid such as isopropylamine dodecylbenzene sulfonate.

4. A dyebath comprising the composition of claim 1 dispersed in a halogenated hydrocarbon.

5. A dyebath comprising the composition of claim 2 dispersed in a solvent selected from perchlorethylene, trichlorethylene, and 1,1,1-trichloroethane.

* * * * *